Patented Apr. 23, 1940

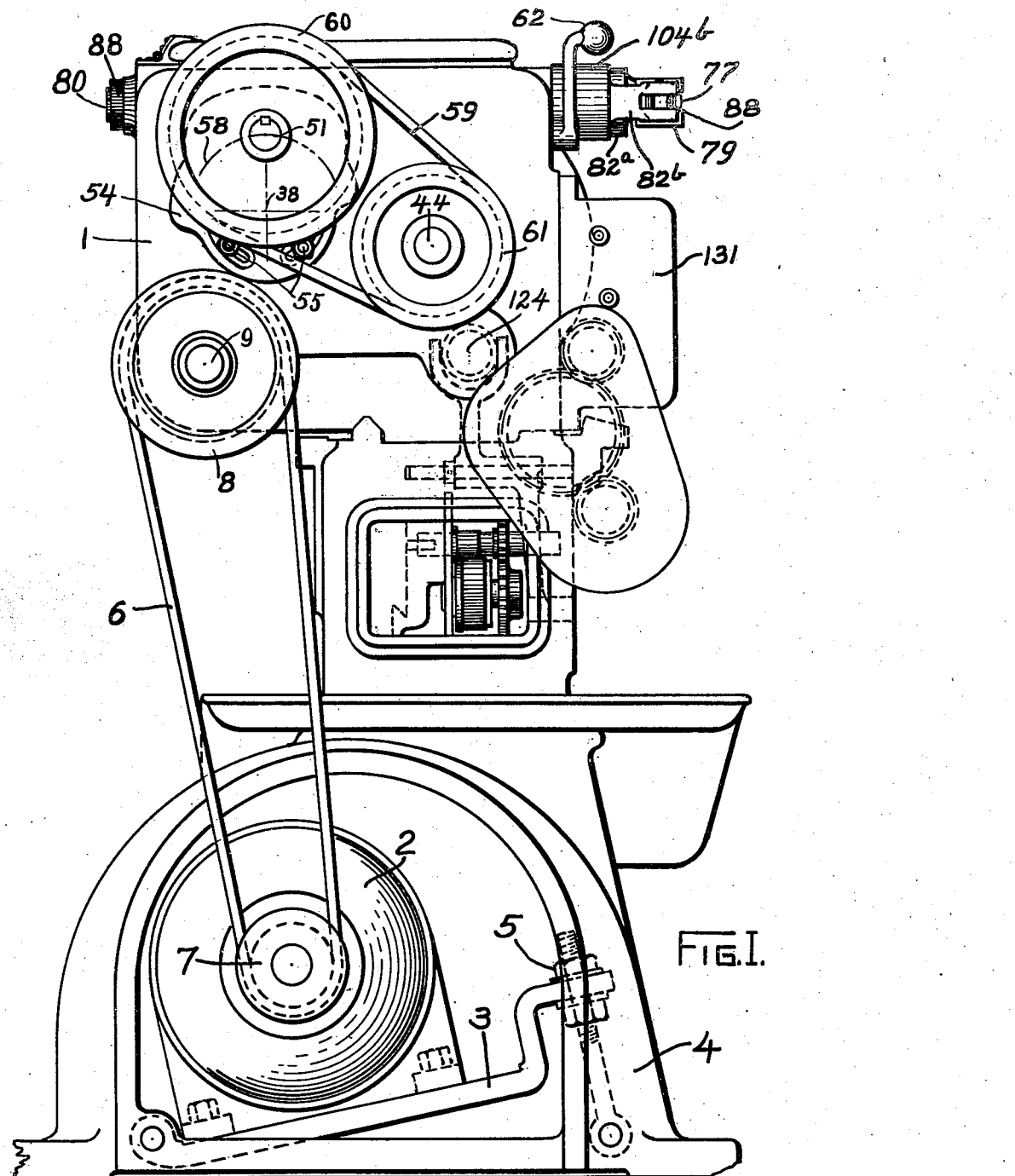
Fig. I.

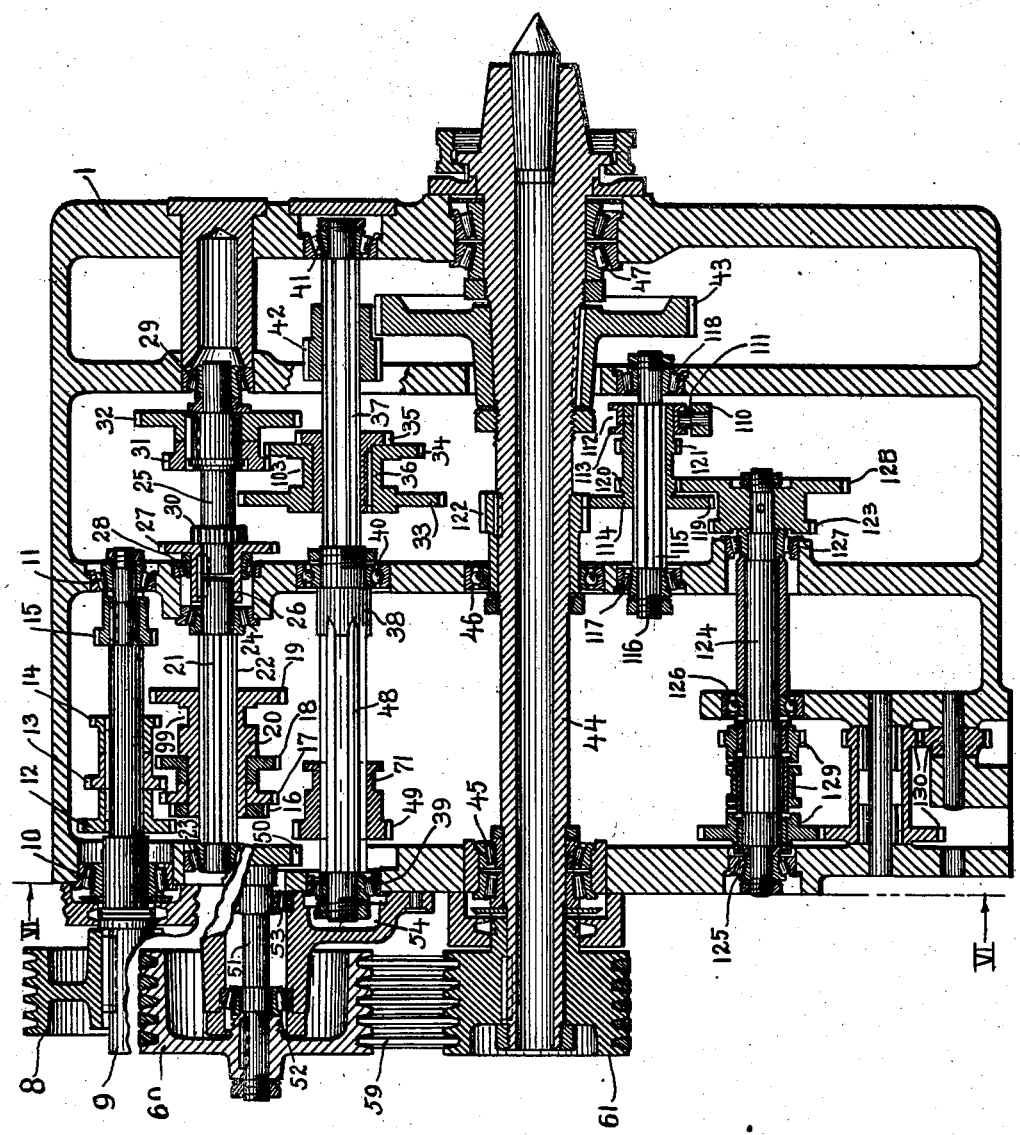

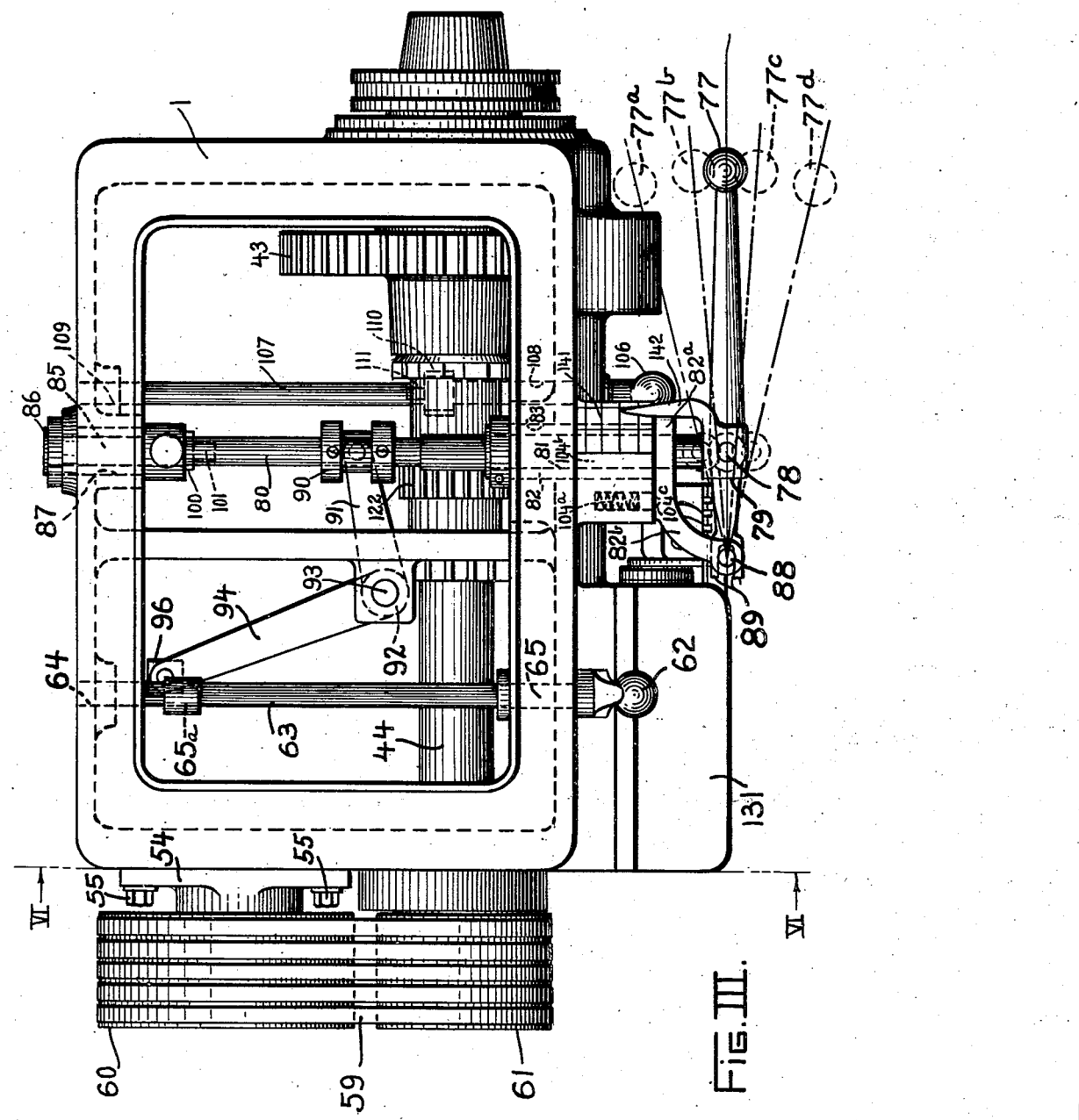

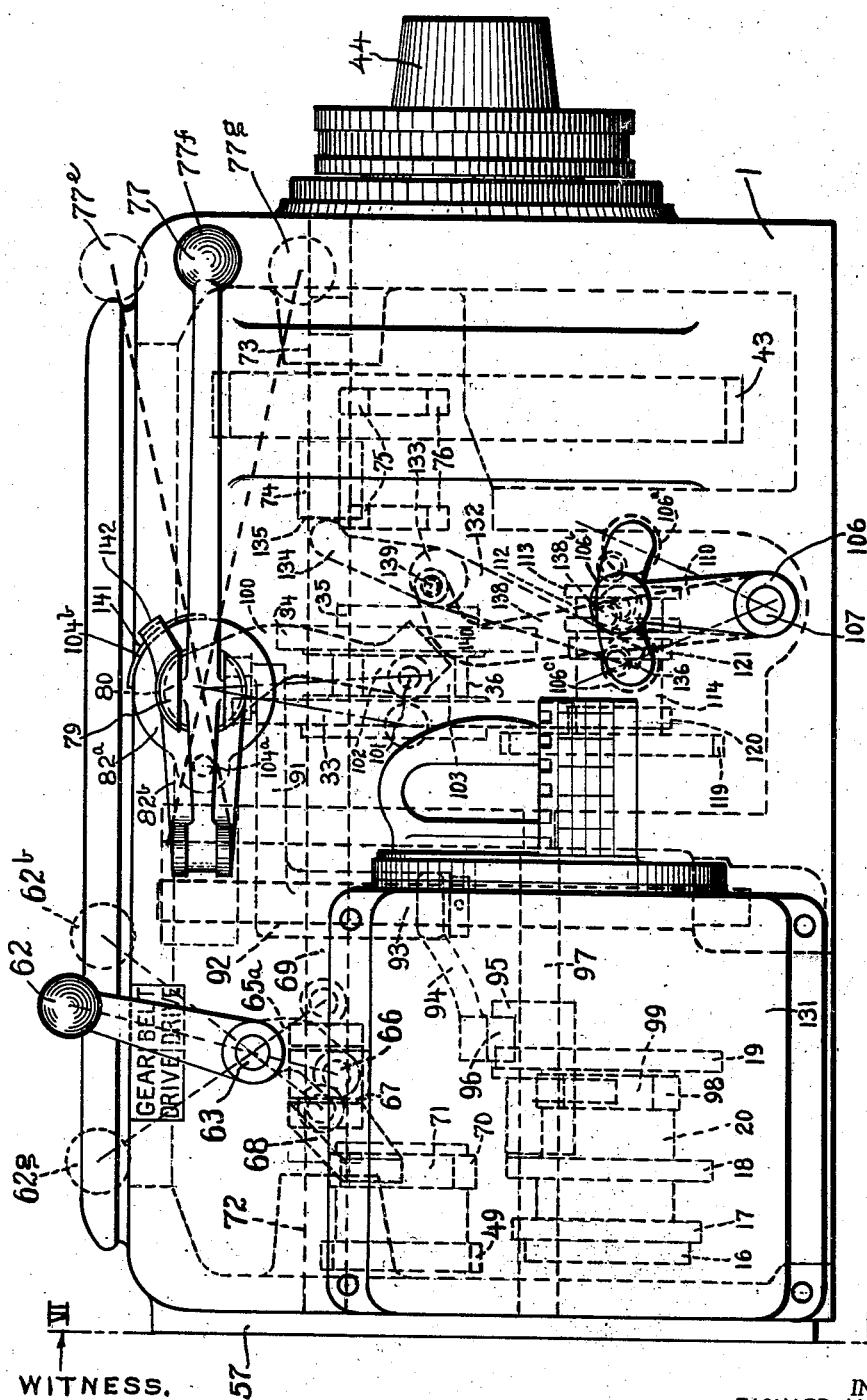

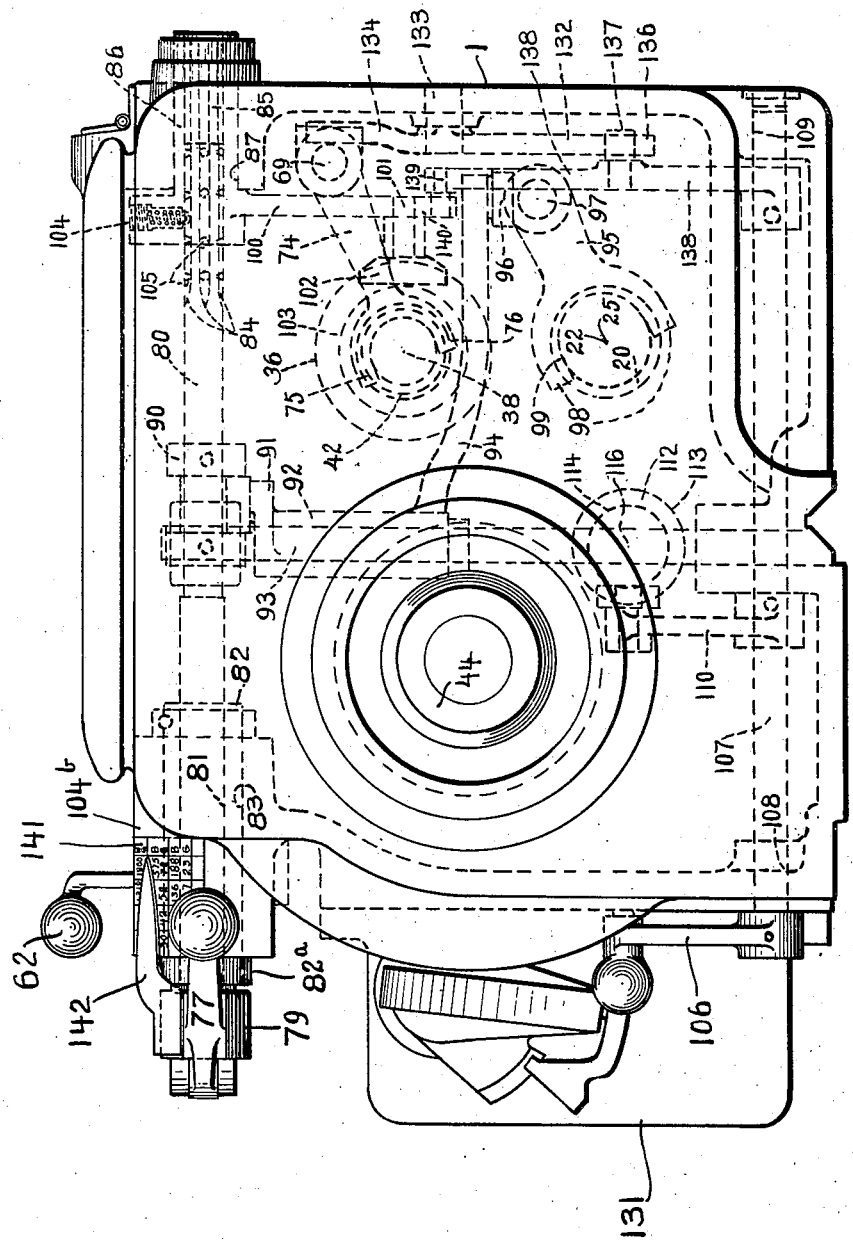

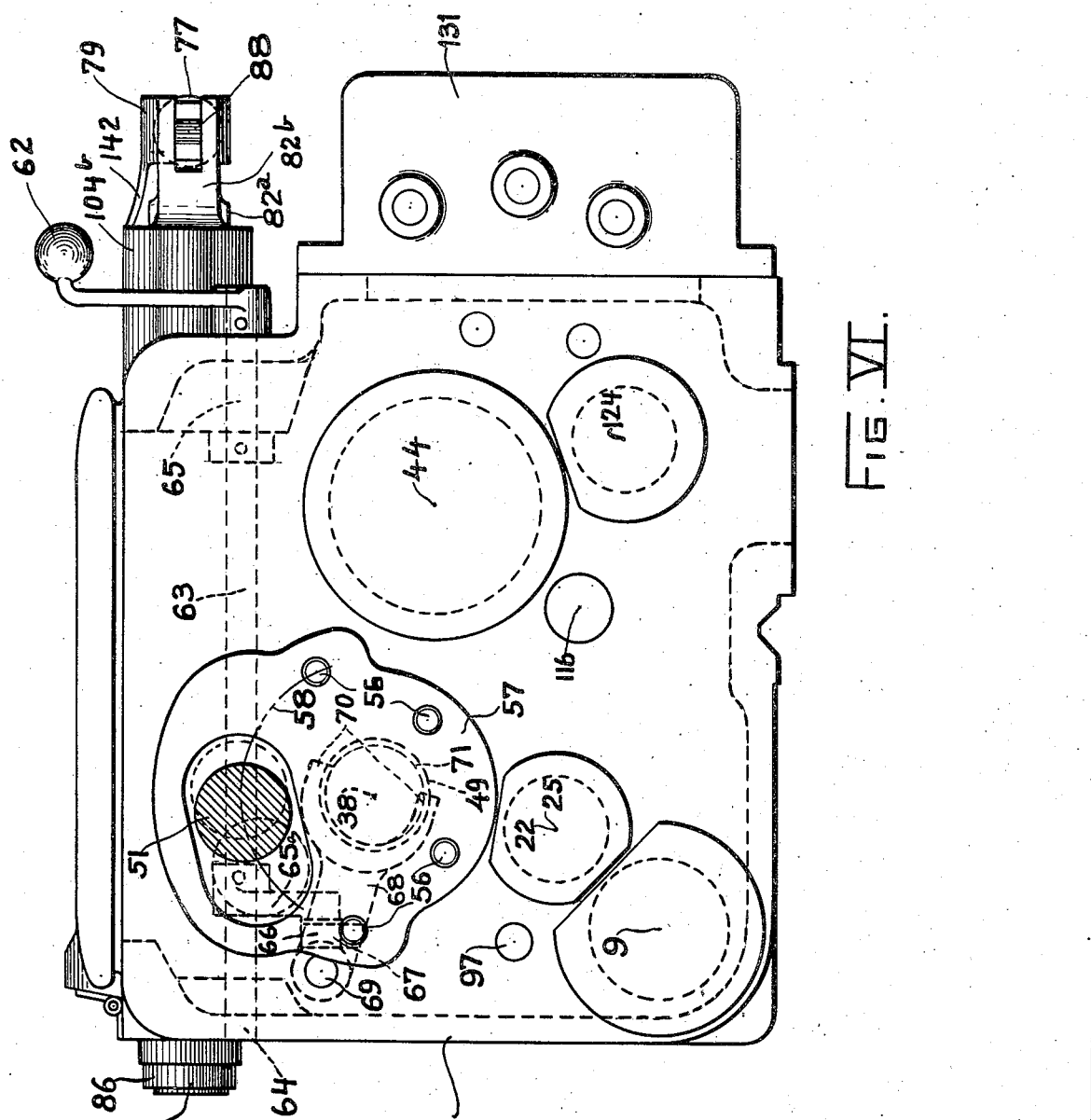

2,197,893

UNITED STATES PATENT OFFICE 2,197,893

LATHE HEADSTOCK

Richard K. Le Blond and William F. Groene, Cincinnati, Ohio, assignors to The R. K. Le Blond Machine Tool Company, Cincinnati, Ohio, a corporation of Delaware Application January 16, 1939, Serial No. 251,060

16 Claims. (Cl. 82—29)

This invention pertains to improvements in headstocks for lathes which are adapted for use particularly with the type of lathes known as engine or tool room lathes for example of a character shown in application Serial No. 84,500, filed June 10, 1936. Two chief factors must be kept in mind when designing such types of lathes: (1) These types of lathes are to be used to do a very large variety of different types of work, and (2) the accuracy and finish of the completed work surface must be of the highest order.

As a result, the speed changes in a headstock for such a lathe must be so effected as to permit very rapid and simple changing of the speeds with a minimum of effort and thought upon the part of the operator. And it is also essential that the lathe be adaptable to taking accurate finishing cuts without leaving gear chatter marks on the completed work surface while at the same time being adaptable to taking heavy roughing cuts for quickly preparing work for this accurate finish turning.

It has been found that when light finishing cuts are taken with a lathe having a headstock in which the spindle is directly driven by a gearing of the conventional headstock transmission that gear teeth chatter marks result on the finished work piece. This is due to the interaction of the gear teeth of the gears on the lathe spindle and their driving gears in mesh with them. It is practically impossible to construct this gearing so that absolute smooth, uniform rotation may be effected for the spindle rotation. As a result the interaction of this gearing when driving the spindle causes the spindle to rotate at rapidly increasing and decreasing rates as the teeth of the gears enter and leave one another. Thus, since the tool carriage moves along the work, being thus rotated irregularly by the spindle, at a uniform slow rate a series of irregularities or chatter marks are produced on the work surface which impair the final accuracy and surface finish on the completed work piece.

This form of gear teeth chatter marks is to be distinguished from the common form of chatter resulting from relative vibration between the work and cutting tool which particularly occurs during heavy cutting on a work piece with a large heavy tool. In this latter type of chatter a great deal of noise and vibration is set up in the entire machine structure whereas in the former gear tooth type of chatter substantially no noise or vibration is produced. This latter type of chatter is not difficult to overcome nor does its effect on the work do any harm as this occurs only during roughing out the work piece.

The gear tooth chatter, however, which results when taking light finishing cuts has been most objectionable and difficult to overcome.

In order to solve this problem we have arranged a lathe with a gear drive for the spindle for roughing out work at low speed and a belt drive for the spindle when finishing work at high speed. An advantage of this belt drive for the spindle is the quiet operation of the lathe at the high speeds usually required when high speed carbide cutting tools are used in finishing or rapid stock removal at high spindle speeds.

An object of this invention is to provide a lathe headstock with a spindle which may be driven at a plurality of different speeds through a direct gear drive to the spindle or a direct belt drive to the spindle.

Another object is to provide a lathe headstock with a spindle which may be driven through gearing at a plurality of relatively slow speeds for roughing operations and which spindle may be directly driven through belting at a plurality of relatively high speeds for finishing operations of high accuracy and free of gear teeth chatter marks.

A further object is to arrange a lathe headstock having both a direct gear drive and a direct belt drive for the spindle so that thread chasing may be undertaken with either of the above drives in operation.

Another object is to arrange a lathe headstock, having both a gear drive and a belt drive for the work spindle, with the belt drive outside of the headstock casing where it is easily accessible for replacement or adjustment of the belting.

It is also our intention to provide in conjunction with a lathe headstock having a change speed gear drive and a change speed belt drive for the spindle, a single lever control means for effecting the speed changes in either of said drives.

And still another object is to provide in conjunction with a lathe headstock having a change speed gear drive and a change speed belt drive for the spindle, a control lever effective for rendering one or the other of said drives operative, and a single lever control means for effecting the speed changes in either of said drives.

Further features and advantages of our invention will appear from the following detailed description of the drawings in which:

Figure I is a left hand end elevation of a lathe having the novel headstock of this invention, particularly showing the motor drive for the headstock and the belt drive for the work spindle.

Figure II is a diagrammatic section through the headstock transmission.

Figure III is a plan view of the headstock with the top cover removed.

Figure IV is a front elevation of the headstock particularly showing the control levers for the transmission.

Figure V is a right hand end elevation of the headstock.

Figure VI is a left hand elevation of the headstock, partly in section on the line VI—VI of Figures II, III, and IV.

Referring particularly to Figures I and II, power for operating the headstock 1 of the lathe is derived from the main driving motor 2 mounted on the adjustable motor plate 3 carried in the leg 4 of the lathe. Adjusting means 5 is provided for the plate 3 so that proper tension in the belts 6, connecting the motor pulley 7 to the driving pulley 8 of the headstock, may be maintained.

The driving pulley 8 is fixed on the driving pulley shaft 9 journaled in bearings 10 and 11 in the headstock housing 1. On the shaft 9 are fixed the various sized gears 12, 13, 14, and 15 which are adapted to be engaged selectively by the respective gears 16, 17, 18, and 19 of the cluster gear 20 slidably mounted on the splined portion 21 of the shaft 22 journaled on the bearings 23 and 24 in the headstock housing 1. By axially shifting the cluster gear 20 four different speed selections may be obtained for the shaft 22 with the motor 2 operating at constant speed.

Coupled coaxially with the shaft 22 is the shaft 25 by means of the hub 26 of the gear 27 fixed to both shafts, the shaft 25 being journaled to rotate in the bearings 28 and 29 in the headstock housing 1. Formed integral with the shaft 25 is the gear 30 and fixed on this shaft is the gears 31 and 32. These gears are adapted to be engaged selectively by the respective gears 33, 34, and 35 of the cluster gear 36 slidably mounted on the splined portion 37 of the shaft 38 journaled in bearings 39, 40, and 41 in the headstock housing 1. By axially shifting this cluster gear 36 three different speed selections may be obtained for the shaft 38 relative to the shaft 25.

Slidably mounted on the splined portion 37 of the shaft 38 is the back gear pinion 42 which may be engaged or disengaged with the face gear 43 fixed on the lathe spindle 44 journaled in bearings 45, 46, and 47 in the headstock housing 1. Thus when the pinion 42 is shifted in engagement with the gear 43 the spindle 44 may be rotated through direct gear drive at twelve different speed selections effected by appropriately shifting the cluster gears 20 and 36 as described.

Slidably mounted on the splined portion 48 of the shaft 38 is the gear 49 which may be shifted into engagement with a gear 50 fixed on a shaft 51 journaled on bearings 52 and 53 carried in the belt adjusting bracket 54, this bracket being pivotally mounted about the axis of rotation of the shaft 38 and locked in place on the headstock housing 1 by suitable clamping bolts 55 fitting in the tapped holes 56 of the integral pad 57 of said housing. The bracket 54 and the shaft 51 can thus be adjusted along the arc 58 for installing and adjusting the tension in the belts 59 which operate over the driving pulley 60 fixed on the shaft 51 and the driven pulley 61 fixed on the spindle 44. It will thus be seen that when pinion 42 is disengaged from the face gear 43 and gear 49 engaged with gear 50 the spindle 44 may be directly driven through the belts 59 at twelve different selections of speeds effected by appropriately shifting the cluster gears 20 and 36 as described. When thus being driven the spindle is free of all gear driving action. Preferably the ratio through the gears 49 and 50 and the pulleys 60 and 61 is so arranged relative to the ratio of the gears 42 and 43 that the spindle is rotated at a higher range of speeds than when driven through the gears 42 and 43. Thus twenty-four speed changes may be effected for the spindle, twelve relatively slow speeds through direct gear drive, and twelve relatively high speeds through direct belt drive.

The pinion 42 and gear 49 are appropriately shifted by means of the range selection lever 62 fixed on the rock shaft 63 mounted in bearings 64 and 65 in the headstock housing 1, the lever having a position 62G for the gear drive range and a position 62B for the belt drive range. On the rock shaft 63 is fixed a downwardly extending lever arm 65a which has a projection 66 engaging in a slot 67 in the shifter fork 68, which fork is fixed on the axially slidable shifter rod 69 and having its forked end 70 fitting in the annular slot 71 of the gear 49 so that by manipulating the lever 62 and rocking the shaft 63 the rod 69 may be slid axially in its bearings 72 and 73 in the headstock housing 1 and the gear 49 slid on the shaft 38. Also fixed on the shifter rod 69 is the shifter fork 74 having its forked ends 75 and 76 extending around the shaft 38 each side of the gear 42 whereby this gear is moved simultaneously with the gear 49 whereby one or the other of these gears may be engaged with their respective mating gears by manipulating the lever 62.

The cluster gears 20 and 36 may be moved in appropriate sequence to effect the twelve speeds for the shaft 38 by manipulating the single handle control lever 77. This lever 77 is pivotally mounted on a pin 78 carried in the bifurcated end portion 79 of the shifter shaft 80, which shaft may be axially moved and rotated, the shaft being slidably mounted in the bore 81 of the bushing 82, the bushing 82 being rotatably mounted against axial movement in the bearing 83 in headstock housing 1. The rearward part of the shaft 80 has a splined portion 84 slidably fitting in the splined bore 85 of the bushing 86 which is rotatably mounted against axial movement in the bearing 87 in the headstock housing 1.

Formed integral with the flanged portion 82a of the bushing 82 is a fulcrum arm 82b having a pin 88 fixed in its outer end which passes through the slotted portion 89 of the lever 77 so that when the lever is moved in and out relative to the headstock to the various positions 77a, 77b, 77c, or 77d the shifter shaft 80 may be moved axially. When the lever 77 is moved in a vertical plane to the positions 77e, 77f, or 77g the shaft 80 may be rotated.

Movement of the lever 77 to any of the positions 77a to 77d, inclusive, effects shifting of the cluster gear 20 to its four corresponding gear engaging positions. On the shaft 80 is fixed a spool 90 which engages the arm 91 of the bellcrank lever 92 pivotally mounted on the pin 93 fixed in the headstock housing 1, its other arm 94 projecting rearwardly of the headstock to engage the shifter fork 95 by suitable connection 96. This fork 95 is fixed on the shifter rod 97 slidably mounted in the headstock 1, and has forked ends 98 engaging in the annular groove 99 of the cluster gear 20.

Movement of the lever 77 to any of the positions 77e to 77g, inclusive, effects shifting of the cluster gear 36 to its three corresponding gear engaging positions. Formed integral with the bushing 86 is the downwardly projecting lever arm 100 which has a pin 101 at its lower end carrying a suitable shifter shoe 102 engaging in the annular groove 103 of the cluster gear 36.

A spring operated detent plunger 104 carried in the upstanding integral boss of the bushing 86 serves to position the lever 77 in its positions 77a to 77d, inclusive. This detent 104 engages the detent notches 105 in the splines 84 when the shaft 80 is moved axially to position the lever at 77a to 77d, inclusive. A spring urged detent 104a carried in the indicating dial boss 104b engages appropriate detent notches 104c in the flanged portion 82a serves to position lever 77 in any of its positions 77e to 77g, inclusive.

In conjunction with the above transmission is provided feeding mechanism for the lathe tool carriage having the following characteristics.

(a) Means providing fine threads and feeds for all gear speeds and all belt speeds for the lathe spindle.

(b) Means providing regular threads and feeds for all twelve gear speeds for the lathe spindle.

(c) Means providing coarse feed and threads only when the spindle is operating in the four lowest gear drive speeds with the control lever 77 in any of the positions 77g—77a, 77g—77b, 77g—77c, or 77g—77d.

(d) Interlocking and interference mechanism is associated with the speed control lever 77, the gear or belt drive selection lever 62, and feed selection lever 106 so that any of these levers may be manipulated at any time to effect the feeding characteristics in (a), (b) and (c) above in proper sequence and without damage to the lathe mechanism.

The feed selection lever 106 is fixed on the rock shaft 107 journaled in bearings 108 and 109 in the headstock housing 1. On this shaft 107 is fixed the upstanding shifter arm 110 which has a shifter shoe 111 engaging in the slot 112 of the shifter spool 113 fixed on the cluster gear 114, which gear is slidably mounted on the splines 115 of the shaft 116 journaled in suitable bearings 117 and 118 in the headstock housing 1, whereby rocking of the lever 106 effects shifting of the cluster gear 114. This cluster gear 114 is composed of the integral individual gears 119, 120 and 121, gear 119 being arranged to engage the gear 122 fixed on the lathe spindle 44, the gear 27 fixed on the shaft 25, and the gear 123 fixed on the feed reverse shaft 124 journaled in bearings 125, 126, and 127 in the headstock housing 1. The gears 120 and 121, which are identically the same, are adapted to engage the gear 128 also fixed on the feed reverse shaft 124. Power from the shaft 124 is transmitted through the usual feed reversing mechanism 129 and associated gearing 130 to the feed box 131 then to the usual lathe feeding mechanism, for example as shown in application Serial Number 84,500 filed June 10, 1936.

When the feed selection lever is moved to position 106a, the cluster gear 114 will be shifted to the right on shaft 116 and will be in the position shown in Figure II. The gear 122 on the spindle will then be driving the gear 119 of the cluster gear 114, and the gear 120 of this cluster gear 114 drives the gear 128 on the shaft 124. The ratio through this gearing is such as to cause the shaft 124 to rotate considerably slower than the speed of rotation of the spindle 44, in this particular illustration it rotates one-fourth as fast as the spindle 44. This effects fine feeding movements for the tool feed mechanism for the lathe. At this time the cluster gears 20 and 36 may be shifted to any of their positions by manipulating the lever 77 and also either of the gears 42 or 49 may be engaged with their respective mating gears for either gear drive or belt drive for the lathe spindle by manipulating the lever 62. Thus fine feeds and threads may be obtained in all speed ranges of the gear and belt drive for the work spindle.

When the feed selection lever 106 is moved to the position 106b the cluster gear 114 will be moved to an intermediate position so that both gears 120 and 121 will be disengaged from the gear 128 and the gear 119 will be engaged with the gear 122 and 123 as an idler gear, the gears 122 and 123 being arranged with the same number of teeth and pitch diameter. Thus the shaft 124 will be rotated at the same speed as the spindle 44 to effect regular feeds and threads for the lathe tool carriage.

By means of interference mechanism these regular feeds and threads are arranged to be usable only in the range of speeds effected in the gear drive range for the lathe spindle because the feeds in this range are too coarse for the high belt drive speeds and because one could not practically chase threads on work rotating at such high belt drive speeds. Thus when the feed selection lever 106 is in this position 106b only gear 42 may be brought into mesh with the gear 43, gear 49 being kept from engagement with the gear 50. This is accomplished by the lever 132 pivotally mounted on a stud 133 fixed in the rear wall of the head-stock housing 1 which has an upwardly projecting arm 134 engaging the left hand face 135 of the shifter fork 74 and which has a downwardly extending arm 136 which engages a pin 137 fixed in the upstanding lever 138 fixed on the shaft 107 of the lever 106. Thus, with the gear 42 engaged with the gear 43 and the lever 62 in position 62G, this lever 62 could not be moved to position 62b while the lever 106 was in position 106b because the lever 133 engaging the yoke 135 and the pin 137 of the lever 138 would block such a movement. However, if lever 62 is forced to position 62b the lever 106 will be moved by the lever 133 out of position 106b to position 106a and similarly if lever 62 is at 62b moving lever 106 from position 106a to 106b will cause lever 62 to be moved to position 62g. During this time the lever 77 may be placed in any of its positions. Thus regular threads and feeds may be obtained in all gear drive speeds but not in belt drive speeds. It is also to be noted that manipulation of either of the levers 62 or 106 at this time will cause no damage to the lathe mechanism nor destroy the proper relationship of the feed rates to the spindle speeds as previously established.

Interference mechanism is provided so that when the feed selection lever 106 is moved to the position 106c the cluster gear 114 will be shifted to extreme left position so that gear 119 will be driven by gear 27 on shaft 25 and gear 121 will drive gear 128 on shaft 124. Under these conditions shaft 124 will be rotated at a relatively much greater speed than the spindle 44, in this particular instance eight times as fast as the spindle. Thus coarse feeds and threads are obtained for the lathe feed mechanism when the lever 106 is in position 106c.

These coarse feeds and threads are arranged to be usable only in the four lowest speeds of the gear drive range for the lathe spindle because the very coarse character of these feeds and threads preclude their safe use in any of the high ranges of the gear drive or in any of the belt drive ranges. This is accomplished by the lever 133 which prevents engagement of the gears 49 and 50 for belt drive as described for the position 106b of the feed selection lever 106. Also, in addition, the lever 77 is maintained in position 77g—77a, 77g—77b, 77g—77c, or 77g—77d, when lever 106 is in position 106c. This is accomplished by the pin 139 carried in the upper end of the lever arm 138 which engages the abutment face 140 formed on the lever arm 100 when the feed selection lever 106 is at 106c thus preventing lever being moved from 77g to either 77f or 77e. If the lever 77 is moved to either of these latter positions, the abutment face 140 will bear against the pin 139 and move the feed selection lever into regular feeds and threads position.

Associated with the control lever 77 is dial indicating mechanism showing all gear drive and belt drive speed selections obtainable by manipulating the levers 77 and 62 as described. On the boss 104b is mounted an arcuate index plate 141 over which moves the indicating finger 142 attached to the bifurcated portion 79 of the shaft 80 to clearly indicate positions for the lever 77 to select all speed changes for the headstock transmission.

Having thus fully set forth and described our invention, what we claim is new and desire to secure by United States Letters Patent is:

1. In a lathe headstock, a rotatable work spindle, a change speed gear transmission in said headstock, a gear drive connection between said transmission and said spindle, a belt drive connection between said transmission and said spindle, a single lever control means for effecting all speed changes in said transmission, a control lever for selecting either said gear drive or said belt drive connection, and interference mechanism between said levers whereby movement of said single lever control means is limited by positions selected for said control lever.

2. In a lathe headstock, a housing, a driving shaft journaled in said housing, a motor for rotating said shaft, an intermediate shaft journaled in said housing, change speed gearing interconnecting said shafts for rotating said intermediate shaft at a plurality of different speeds, a back gear shaft journaled in said housing, change speed gearing interconnecting said intermediate and back gear shafts, a gear drive, and a belt drive connection between said back gear shaft and said spindle, means for effecting changes in said change speed gearing, and means for alternately rendering said gear drive or said belt drive connection operative.

3. In a lathe headstock, a housing, a driving shaft journaled in said housing, a motor for rotating said shaft, an intermediate shaft journaled in said housing, change speed gearing interconnecting said shafts for rotating said intermediate shaft at a plurality of different speeds, a back gear shaft journaled in said housing, change speed gearing interconnecting said intermediate and back gear shafts, a gear drive and a belt drive connection between said back gear shaft and said spindle, belt adjusting means associated with said belt drive connection, means for effecting changes in said change speed gearing, and means for alternately rendering said gear drive or said belt drive connection operative.

4. In a lathe headstock, a housing, a driving shaft journaled in said housing, a motor for rotating said shaft, an intermediate shaft journaled in said housing, change speed gearing interconnecting said shafts for rotating said intermediate shaft at a plurality of different speeds, a back gear shaft journaled in said housing, change speed gearing interconnecting said intermediate and back gear shafts, a gear drive connection in said housing between said back gear shaft and said spindle, a belt drive connection outside of said housing between said back gear shaft and said spindle, means for effecting changes in said change speed gearing, and means for alternately rendering one or the other of said driving connections operative.

5. In a lathe headstock, a housing, a driving shaft journaled in said housing, a motor for rotating said shaft, an intermediate shaft journaled in said housing, change speed gearing interconnecting said shafts for rotating said intermediate shaft at a plurality of different speeds, a back gear shaft journaled in said housing, change speed gearing interconnecting said intermediate and back gear shafts, a low speed gear drive connection between said back gear shaft and said spindle, a high speed belt drive between said back gear shaft and said spindle, means for effecting changes in said change speed gearing, and means for alternately rendering one or the other of said driving connections operative.

6. In a lathe headstock, a housing, a driving shaft journaled in said housing, a motor for rotating said shaft, an intermediate shaft journaled in said housing, change speed gearing interconnecting said shafts for rotating said intermediate shaft at a plurality of different speeds, a back gear shaft journaled in said housing, change speed gearing interconnecting said intermediate and back gear shafts, a low speed gear drive connection between said back gear shaft and said spindle, a high speed belt drive between said back gear shaft and said spindle, a control lever for effecting changes in said change speed gearing, and an interrelated control lever for alternately rendering one or the other of said driving connections operative when said first mentioned control lever is moved to certain selected positions.

7. In a lathe headstock, a rotatable work spindle, a change speed transmission having primary fine speed changes and secondary coarse speed changes, and a single lever control means movable in a plane to effect said fine speed changes and movable in another plane to effect said coarse speed changes.

8. In a lathe headstock, a rotatable work spindle, a change speed transmission having primary fine speed changes and secondary coarse speed changes, and a single lever control means swinging in a substantially horizontal plane to effect said fine speed changes and swinging in a substantially vertical plane to effect said coarse speed changes.

9. In a lathe headstock, a rotatable work spindle, a change speed transmission having primary fine speed changes and secondary coarse speed changes, a single lever control means swinging in a substantially horizontal plane to effect said fine speed changes and swinging in a substantially vertical plane to effect said coarse speed changes, dial indicating means on said headstock associated with said lever to indicate all selected positions for said lever, and detent means associated with said lever to facilitate location of said lever in said positions.

10. In a lathe, a headstock, a tool carriage, a change speed transmission having a plurality of gear speeds a rotatable work spindle, a low speed direct drive connection between said transmission and said spindle, a high speed belt drive connection between said transmission and said spindle, change speed transmission mechanism between said spindle and said carriage for actuating said carriage at fine, regular, or coarse threads and feeds, and means for effecting speed changes in said transmissions and for rendering said connections operative in a predetermined sequence.

11. In a lathe, a headstock, a tool carriage, a change speed transmission having a plurality of gear speeds, a rotatable work spindle, a low speed direct drive connection between said transmission and said spindle, a high speed belt drive connection between said transmission and said spindle, change speed transmission mechanism between said spindle and said carriage for actuating said carriage at fine, regular, or coarse threads and feeds, and means for effecting speed changes in said transmissions and for rendering said connections operative in a predetermined sequence, to provide (a) fine threads and feeds for all gear speeds and all belt speeds, (b) regular threads and feeds for all gear speeds, and (c) coarse threads and feeds in the lowest gear speeds.

12. In a lathe, a headstock, a tool carriage, a change speed transmission having a plurality of gear speeds, a rotatable work spindle, a low speed direct drive connection between said transmission and said spindle, a high speed belt drive connection between said transmission and said spindle, change speed transmission mechanism between said spindle and said carriage for actuating said carriage at fine, regular, or coarse threads and feeds, a speed control lever for effecting speed changes in said first mentioned transmission a range selection lever for selecting said direct or belt drive connections, a feed selection lever for effecting speed changes in said last mentioned transmission, and interlocking interference mechanism associated with all of said levers to limit their movements to predetermined selected positions.

13. In a lathe, a headstock, a tool carriage, a change speed transmission, a rotatable work spindle, a direct drive connection between said transmission and said spindle, a belt drive connection between said transmission and said spindle, a change speed transmission between said spindle and said carriage, and means for effecting speed changes in said transmissions and for rendering said drive connections operative in a predetermined sequence.

14. In a lathe, a headstock, a work spindle in said headstock, a tool carriage, a change speed gear transmission in said headstock having a plurality of fine speed changes and a plurality of coarse speed changes, a slow speed gear drive connection between said transmission and said spindle, a high speed belt drive between said transmission and said spindle, a change speed transmission between said spindle and said carriage, and interrelated control mechanism, associated with said transmissions and said drive connections, arranged to permit selection of all of said speed changes in said first mentioned transmission and the selection of either of said drive connections only when said last mentioned transmission is operating in its slowest speed range.

15. In a lathe, a headstock, a work spindle in said headstock, a tool carriage, a change speed gear transmission in said headstock having a plurality of fine speed changes and a plurality of coarse speed changes, a slow speed gear drive connection between said transmission and said spindle, a high speed belt drive between said transmission and said spindle, a change speed transmission between said spindle and said carriage, and interrelated control mechanism, associated with said transmission and said drive connections, arranged to permit selection of all of said speed changes in said first mentioned transmission and only said slow speed gear drive connection when said last mentioned transmission is operating in all but its highest speed range.

16. In a lathe, a headstock, a work spindle in said headstock, a tool carriage, a change speed gear transmission in said headstock having a plurality of fine speed changes and a plurality of coarse speed changes, a slow speed gear drive connection between said transmission and said spindle, a high speed belt drive between said transmission and said spindle, a change speed transmission between said spindle and said carriage, and interrelated control mechanism, associated with said transmissions and said drive connections, arranged to permit selection of all of the fine speed changes but only the slowest of the coarse speed changes of said first mentioned transmission and only said slow speed gear drive connection when said last mentioned transmission is operating in any of its speed ranges.

RICHARD K. LE BLOND.
WILLIAM F. GROENE.